United States Patent

Fujimura et al.

[11] Patent Number: 5,857,913
[45] Date of Patent: Jan. 12, 1999

[54] HOLLOW SHAFT REDUCTION GEAR WITH OVERLOAD PROTECTING DEVICE

[75] Inventors: Katsumi Fujimura; Yojitsu Kim; Yoshikazu Ueyama, all of Osaka-fu, Japan

[73] Assignee: Tsubakimoto Emerson Co., Osaka-fu, Japan

[21] Appl. No.: 706,526

[22] Filed: Sep. 4, 1996

[30] Foreign Application Priority Data

Sep. 6, 1995 [JP] Japan ................................. 7-229203
May 31, 1996 [JP] Japan ................................. 8-138602

[51] Int. Cl.⁶ ............................................. F16D 7/06
[52] U.S. Cl. .................................... 464/36; 192/56.62
[58] Field of Search ............................. 464/30, 35, 36; 192/56.54, 56.62, 56.57

[56] References Cited

U.S. PATENT DOCUMENTS

| | | | |
|---|---|---|---|
| 3,552,147 | 1/1971 | Johansson et al. | 464/35 |
| 3,979,925 | 9/1976 | Kato | 464/35 |
| 4,075,873 | 2/1978 | Geisthoff | 192/56.57 |
| 4,263,789 | 4/1981 | Koepke et al. | 192/56.62 X |
| 4,605,111 | 8/1986 | Ohno et al. | 464/36 X |
| 4,637,502 | 1/1987 | Mayr et al. | 192/56.57 |
| 5,035,311 | 7/1991 | Girguis | 464/36 X |
| 5,076,421 | 12/1991 | Walker | 464/35 X |

FOREIGN PATENT DOCUMENTS

| | | |
|---|---|---|
| 60-29927 | 2/1985 | Japan. |
| 62-25327 | 2/1987 | Japan. |
| 62-179427 | 11/1987 | Japan. |

*Primary Examiner*—Eileen Dunn Lillis
*Attorney, Agent, or Firm*—Dann, Dorfman, Herrell and Skillman; Henry H. Skillman

[57] ABSTRACT

Hollow shaft reduction gear with overload protecting device facilitating adjusting the torque of the overload protecting device and repairing the device. A drive plate (8) is axially slidably mounted on one end portion of a hollow output shaft (2) projecting outside from a gear case (1). The drive plate is restrained from rotation relative to the hollow output shaft (2). A driven plate (11) is fixedly mounted on one end portion of a driven shaft (7) projecting from the extremity of the end portion of the hollow output shaft (2) so as to confront the drive plate (8). An interlocking recess (13) and a holding recess (14) are formed in the confronting surfaces of the drive plate (8) and the driven plate (11) respectively, and a ball 15 is held between the recesses (13, 14). The drive plate (8) is biased toward the driven plate (11) by a spring (16). When an excessive load torque acts on the driven shaft (7), the ball (15) moves out of the interlocking recess (13) and the driven plate (11) slips relative to the drive plate (8). The biasing force of the spring (16) is adjusted by a spring-pressure adjusting nut (18).

7 Claims, 8 Drawing Sheets

HOLLOW SHAFT REDUCTION GEAR WITH OVERLOAD PROTECTING DEVICE

FIELD OF THE INVENTION

The present invention relates to a hollow shaft reduction gear with overload protecting device.

BACKGROUND OF THE INVENTION

Figure 10:
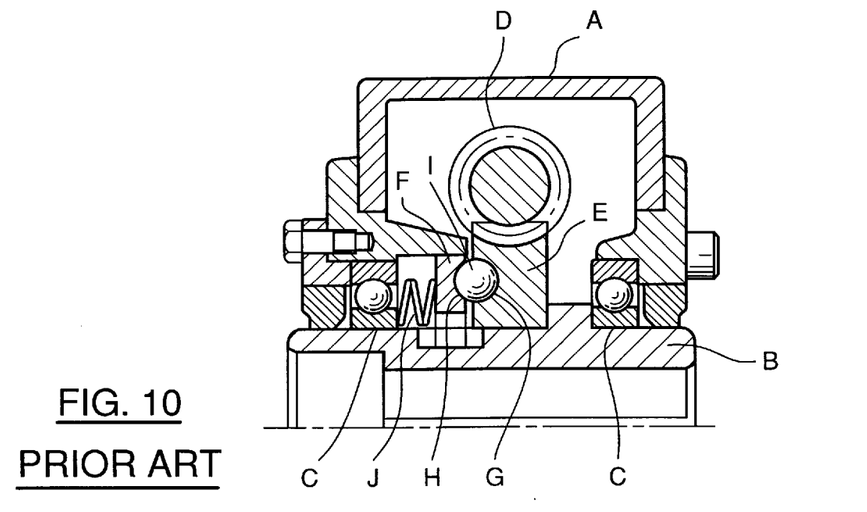
FIG. 10 is a half sectional view of an example of a conventional hollow shaft reduction gear assembly with overload protection device.

A known hollow shaft reduction gear is shown in FIG. 10, and has a hollow output shaft, and a driven shaft inserted in the output shaft so as to be coupled with the output shaft.

As shown, the hollow output shaft B is extended through and supported for rotation in bearings C on a gear case A. A worm wheel E is mounted on the output shaft B and in engagement with a worm D connected to a drive means (not shown). The output shaft B is driven for rotation at an output rotating speed lower than the input rotating speed through the worm D. A plate F is mounted on the output shaft B in the gear case A to confront the worm wheel E so as to rotate together with the output shaft B, but so as to be axially slidable on the shaft B.

A hemispherical recess G is formed in a surface of the worm wheel E facing the plate F, a hemispherical recess H is formed in a surface of the plate F so as to correspond with the hemispherical recess G, and a ball I is interposed between the hemispherical recesses G and H. The plate F is biased continuously toward the worm wheel E by a spring J so that the ball I is held between the respective hemispherical recesses G and H of the worm wheel E and the plate F. When the worm wheel E is rotated through the worm D by the drive means, a driving torque is transmitted through the ball I and the plate F to the output shaft B.

When the driven shaft (not shown) coupled with the output shaft B is overloaded, the plate F is moved away from the worm wheel E against the biasing force of the spring J. Consequently, the ball I moves out of the hemispherical recess of the plate F or the worm wheel E and the worm wheel E and the plate F slip relative to each other.

In the known hollow shaft reduction gear thus constructed, it is difficult to adjust transmission torque because an overload protecting device is placed in the gear case, and the gear case needs to be disassembled for torque adjustment. When the overload protecting device needs repair or the parts of the overload protecting devices need to be replaced, the gear case must be disassembled, which requires difficult work.

SUMMARY OF THE INVENTION

Accordingly, it is an object of the present invention to provide a hollow shaft reduction gear assembly with overload protecting assembly solving the problems in the prior art and facilitating work for adjusting the torque of the overload protecting device and repairing the device.

More specifically, the present invention provides an assembly in which the reduction gearing is housed in a case which provides rotating support for the output shaft, which has an end portion projecting externally of the case. The output shaft is coupled to a drive shaft through an adjustable overload protecting device which is external of the case.

According to first and second embodiments of the invention, a hollow shaft reduction gear with overload protecting device comprises a hollow output shaft extended through and supported for rotation on a gear case, a driven shaft inserted in the hollow output shaft as to be only rotatable relative to the output shaft, a drive plate mounted on an end portion of the output shaft projecting externally of the gear case so as to be axially slidable and restrained from rotation relative to the output shaft, a driven plate fixedly mounted on an end portion of the driven shaft projecting from the end portion of the output shaft so as to confront the drive plate, an interlocking recess formed in one of the confronting surfaces of the drive plate and the driven plate and a holding recess formed in the other confronting surface, a ball held between the interlocking recess and the holding recess, a spring biasing the drive plate toward the driven plate, and a spring pressure adjusting mechanism for adjusting the axial position of the driven plate on the driven shaft to adjust the spring pressure. The interlocking recess and the holding recess are formed in shapes that keep the ball in the holding recess and allow the ball to move out of the interlocking recess when the driven shaft is overloaded.

According to a third embodiment of the invention, a hollow shaft reduction gear with overload protecting device comprises: a hollow output shaft extended through and supported for rotation on a gear case, a driven shaft inserted in the hollow output shaft so as to be only rotatable relative to the output shaft, a drive plate or flange fixed on an end portion of the output shaft projecting externally of the gear case, a driven plate mounted on an end portion of the driven shaft projecting from the end portion of the output shaft so as to confront the drive plate and to be axially slidable and restrained from rotation relative to the driven shaft, an interlocking recess formed in one of the confronting surfaces of the drive plate and the driven plate and a holding recess formed in the other confronting surface, a ball held between the interlocking recess and the holding recess, a spring biasing the driven plate toward the drive plate, and a spring pressure adjusting mechanism for adjusting the spring pressure of the spring. The interlocking recess and the holding recess are formed in shapes that keep the ball in the holding recess and allow the ball to move out of the interlocking recess when the driven shaft is overloaded.

According to another feature of the above embodiments, the spring pressure adjusting mechanism includes an externally threaded portion in the end portion of the driven shaft extending beyond a portion of the driven shaft in which the driven plate is located, and a spring pressure adjusting nut screwed on the externally threaded portion of the driven shaft to adjust the compression of the spring and/or to prevent axial movement of the driven plate.

According to a fourth embodiment of the invention, a hollow shaft reduction gear with overload protecting device comprises a hollow output shaft extended through and supported for rotation on a gear case, a driven shaft rotatably inserted in the hollow output shaft, a drive plate mounted on an end portion of the output shaft projecting externally from the gear case so as to be axially slidable and restrained from rotation relative to the output shaft, a driven plate mounted on the output shaft on the side of the end of the output shaft so as to confront the drive plate and to be rotatable and axially movable on the output shaft, an interlocking recess formed in one of the confronting surfaces of the drive plate and the driven plate and a holding recess formed in the other confronting surface, a ball held between the interlocking recess and the holding recess, a spring biasing the drive plate toward the driven plate, a spring pressure adjusting nut screwed on an externally threaded portion of an end portion of the output shaft extending beyond a portion in which the driven plate is located to prevent the axial movement of the driven plate and to adjust the spring pressure of the spring, and a coupling flange mounted on a portion of the driven shaft projecting from the end of the output shaft, restrained from rotation relative to the driven shaft and detachably joined to the driven plate. The interlocking recess and the holding recess are formed in shapes that keep the ball in the holding recess and allow the ball to move out of the interlocking recess when the driven shaft is overloaded.

According to a fifth embodiment of the invention, a hollow shaft reduction gear with overload protecting device comprises a hollow output shaft extended through and supported for rotation on a gear case, a driven shaft rotatably inserted in the hollow output shaft, a drive plate mounted on an end portion of the output shaft projecting externally of the gear case so as to be axially slidable and restrained from rotation relative to the output shaft, a driven plate mounted on an end portion of the driven shaft projecting from the end of the output shaft so as to confront the drive plate and to be restrained from rotation relative to the driven shaft, an interlocking recess formed in one of the confronting surfaces of the drive plate and the driven plate and a holding recess formed in the other confronting surface, a ball held between the interlocking recess and the holding recess, a spring pressure adjusting cover having a hollow, cylindrical wall surrounding the drive plate and the driven plate, and a spring seat part formed by directing one end portion of the hollow, cylindrical wall adjacent the gear case radially inward and having inner edge in sliding contact with the outer circumference of the output shaft, an internally threaded portion being formed in the opposite end portion of the hollow, cylindrical wall remote from the gear case and remote from the spring seat part, a spring disposed between the spring seat part of the spring pressure adjusting cover and the drive plate so as to bias the drive plate toward the driven plate, and a spring pressure adjusting ring provided with an external thread in its outer circumference, screwed in the opposite end portion of the spring pressure adjusting cover provided so that the axial position thereof on the spring pressure adjusting cover is adjustable, and capable of being brought into contact with a surface of the driven plate opposite the aforementioned confronting surface of the same to adjust the spring pressure of the spring. The interlocking recess and the holding recess are formed in shapes that keep the ball in the holding recess and allow the ball to move out of the interlocking recess when the driven shaft is overloaded.

In the invention, the rotation of the output shaft is transmitted through the drive plate, the ball and the driven plate to the driven shaft to drive the driven shaft for rotation. When the driven shaft is overloaded by the load torque, the reaction force from the driven shaft causes the ball, held between the interlocking and holding recesses formed in the respective confronting surfaces, to force the drive plate to move away from the driven plate against the pressure of the spring. The ball stays in the holding recess and moves out of the locking recess to enable the driven plate to slip relative to the drive plate.

When the position of the axially-slidable plate is shifted along the axis of the driven shaft by the spring pressure adjusting mechanism, the compression of the spring and hence the spring pressure biasing the drive plate toward the driven plate of the spring changes, whereby the magnitude of load torque which will cause the driven plate to slip relative to the drive plate can be adjusted. A spring pressure adjusting nut is turned to adjust continuously the magnitude of load torque at which the driven plate starts slipping relative to the drive plate.

In the fourth embodiment of the invention, the rotation of the output shaft is transmitted to a mechanical apparatus through the drive plate, the ball, the driven plate and a coupling flange to the driven shaft to drive the driven shaft for rotation. When the driven shaft is overloaded, the ball moves out of the locking recess to enable the driven plate to slip relative to the drive plate, whereby the hollow shaft reduction gear and the mechanical apparatus connected to the hollow shaft reduction gear are protected from damage due to overloading.

In this fourth embodiment, when adjusting the transmission torque to a maximum transmission torque, the coupling flange is removed from the driven plate, the spring pressure adjusting nut is turned to adjust the spring pressure of the spring biasing the drive plate toward the driven plate, and then the output shaft and the driven shaft are coupled by connecting the coupling flange to the driven plate so as to be restrained from rotation relative to the driven shaft.

In the fifth embodiment of the invention, the drive plate and the driven plate, similarly to those of the fourth embodiment, slip relative to each other when the driven shaft is overloaded. When adjusting the transmission torque to a maximum transmission torque, the spring pressure adjusting ring is turned to adjust the pressure of the spring by increasing or decreasing the distance between the opposed surfaces of the drive plate and the spring seat part of the spring pressure adjusting cover.

BRIEF DESCRIPTION OF THE DRAWINGS

Preferred embodiments of the present invention will be described hereinafter with reference to the accompanying drawings.

DESCRIPTION OF THE PREFERRED EMBODIMENTS

Figure 1:
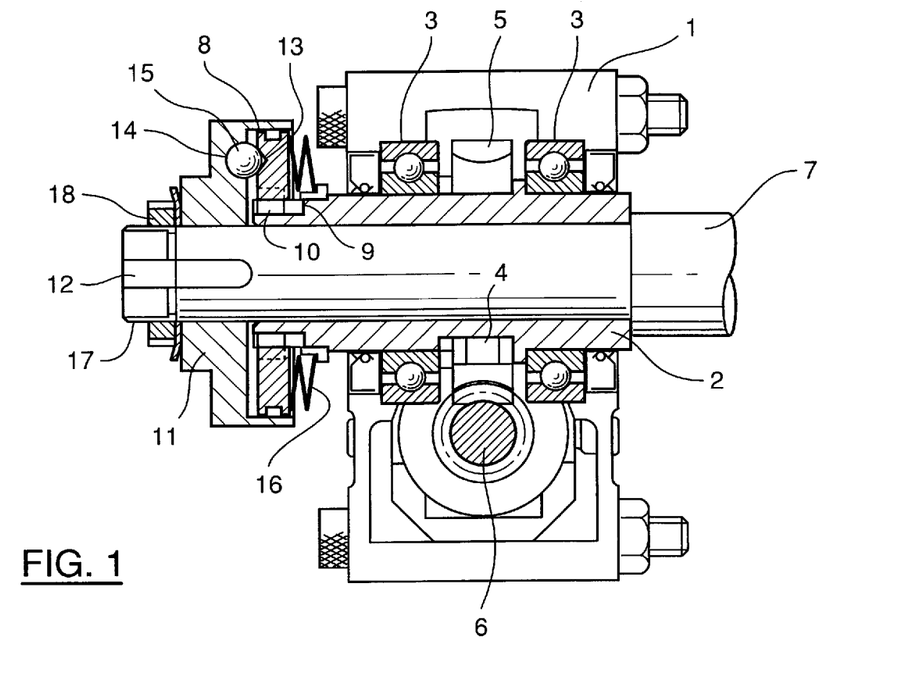
FIG. 1 is a sectional view of a first embodiment of a hollow shaft reduction gear assembly with overload protecting device according to the present invention.

Referring to FIG. 1, a hollow output shaft 2 is extended through and supported for rotation in bearings 3 on a gear case 1 having a rotary driver 6 meshing with a gear wheel 5. The gear wheel comprises a worm wheel 5 fixed to a middle portion of the output shaft 7 with a key 4, and the worm wheel 5 meshes with a worm 6 which is a rotary driver driven by a driving means of a mechanical apparatus, such as a motor. A driven shaft 7 is inserted in the output shaft 2 so as to be rotatable relative to the output shaft 2. A disk-shaped drive plate 8 is mounted on an end portion of the output shaft 2 projecting externally from the gear case 1.

The drive plate 8 is prevented from rotation relative to the output shaft 2 by a key 10 fitted in a keyway 9 formed in the output shaft 2 and is axially movable. An end portion of the driven shaft 7 projects from one end of the output shaft 2. A disk-shaped driven plate 11 is mounted on the end portion of the driven shaft 7 to confront the drive plate 8.

A conical interlocking recess 13 and a spherical holding recess 14 are formed so as to correspond to each other in the confronting axial surfaces of the drive plate 8 and the driven plate 11, respectively, and a steel ball 15 is held between the recesses 13 and 14. A coned disk spring 16 is disposed contiguously with a surface of the drive plate 8 opposite the confronting surface which faces the driven plate 11 to bias the drive plate 8 axially toward the driven plate 11 by the resilience of the coned disk spring 16. The spring has a seat at one end against a shoulder on the hollow output shaft 2 and engages at the other end against the drive plate 8.

The driven plate 11 is restrained from rotation relative to the driven shaft 7 by a key 12. An externally threaded portion 17 is formed by threading an end portion of the driven shaft 7 extending beyond a portion on which the driven plate 11 is mounted. A spring pressure adjusting nut 18 is screwed on the externally threaded portion 17 to prevent the driven plate 11 from falling off the driven shaft 7 and axial movement. The externally threaded portion 17 and the spring pressure adjusting nut 18 constitute a spring pressure adjusting mechanism for adjusting the spring pressure of the coned disk spring 16 by adjusting the axial position of the driven plate 11 on the driven shaft 7. Since the hollow output shaft 2 engages against a shoulder on the driven shaft 7, the nut 18 adjusts the spring pressure biasing the drive plate toward the driven plate.

When the worm 6 is rotated by the drive means, the rotation of the worm 6 is transmitted through the worm wheel 6 to the output shaft 2 to rotate the output shaft 2 at a reduced rotating speed. The drive plate 8 rotates together with the output shaft 2.

Figure 2:
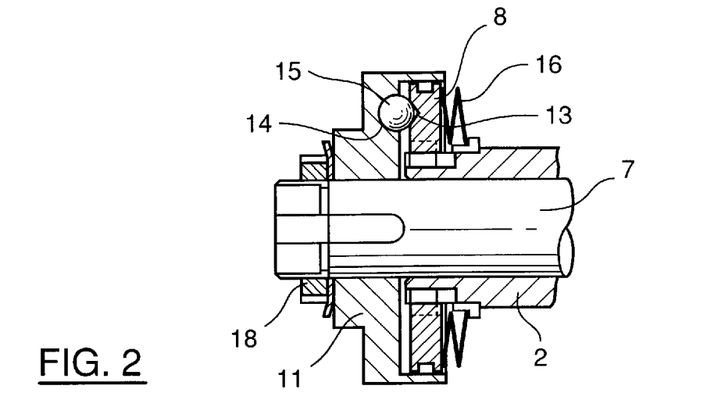
FIG. 2 is a fragmentary sectional view of an essential portion of the first embodiment in a normal state for torque transmission.

Since the drive plate 8 is biased toward the driven plate 11 by the coned disk spring 16 as shown in FIG. 2, rotation is transmitted through the ball 15 held between the interlocking recess 13 and the holding recess 14 formed in the opposite surfaces of the drive plate 8 and the driven plate 11 to the driven plate 11 when a load torque on the driven shaft 7 is not higher than a rated load torque, and the rotation of the driven torque 11 is transmitted to the driven shaft 7 connected to the driven plate 11 by the key 12.

Figure 3:
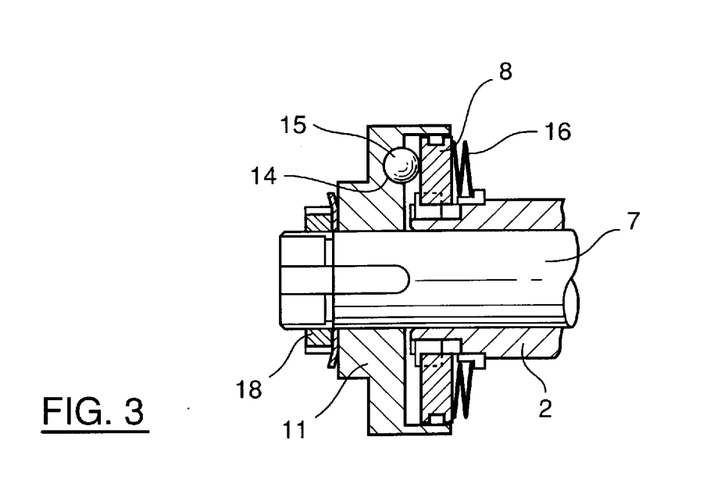
FIG. 3 is a view similar to FIG. 2 of the first embodiment in an overloaded state.

The spring 16 constitutes a pressure device which biases the drive plate 8 towards the drive plate 11 with a set force determined by the compression of the disk spring 16. When the load torque exceeds the rated load torque, the driven shaft 7 transmits a reaction force above the set force, and the ball 15 forces the drive plate 8 to move away from the driven plate 11 against the resilience of the coned disk spring 16 as shown in FIG. 3 and moves out of the interlocking recess 13 of the drive plate 8, so that the drive plate 8 and the driven plate 11 slip relative to each other, and the recesses 13 and 14 pass out of registry.

In this embodiment, the interlocking recess 13 of the drive plate 8 has the shape of a circular cone and the holding recess 14 of the driven plate 11 has the shape of a hemisphere. Therefore, the ball 15 moves out of the conical interlocking recess 13 of the drive plate when an excessive load torque acts on the driven shaft 7, but is unable to escape easily from the holding recess 14 of the driven plate 11, remains held in the holding recess 14 of the driven plate 11 and hence does not fall off.

Accordingly, the ball 15 can be made to be held between the recesses 13 and 14 again by the resilience of the coned disk spring 16 when the drive plate 8 and the driven plate 11 are turned so that the recesses 13 and 14 pass into registry with each other.

A maximum torque that can be transmitted from the output shaft 2 to the driven shaft 7 is adjusted by turning the spring pressure adjusting nut 18. The magnitude of maximum limit torque at which the driven plate 11 starts slipping relative to the drive plate 8 increases when the coned disk spring 16 is compressed and the spring pressure is increased by shifting the drive plate 8 and the driven plate 11 to the right, as viewed in FIG. 1, against the resilience of the coned disk spring 16, and the magnitude of maximum limit torque decreases when the drive plate 8 and the driven plate 11 are shifted to the left.

Figure 4:
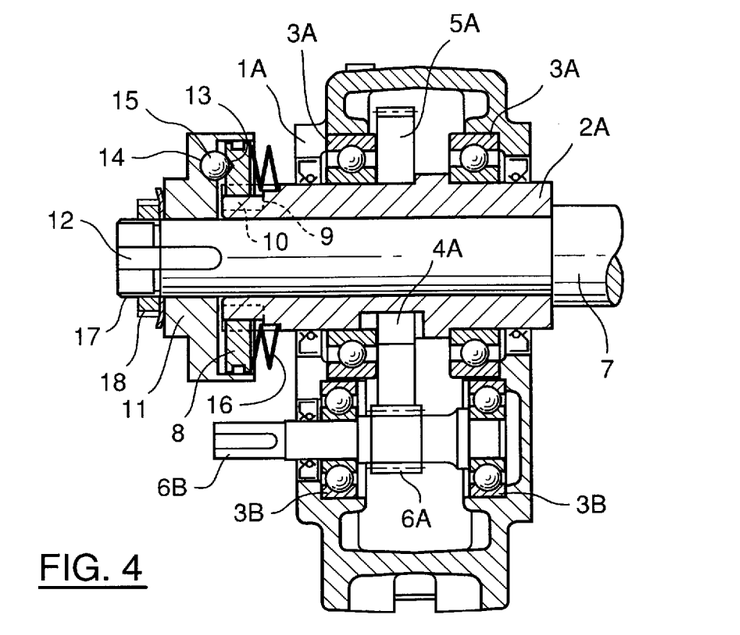
FIG. 4 is a sectional view of a second embodiment of a hollow shaft reduction gear assembly with overload protecting device according to the present invention.

FIG. 4 shows a hollow shaft reduction gear assembly with overload protecting device in a second embodiment according to the present invention, which differs from the hollow shaft reduction gear assembly with overload protecting device in the first embodiment only in the internal structure of the hollow shaft reduction gear, and the structures of the rest of the portions are the same as those of the hollow shaft reduction gear with overload protecting device in the first embodiment. Therefore, in FIG. 4, parts like or corresponding to those shown in FIG. 1 are designated by corresponding reference characters. In the second embodiment, a hollow output shaft 2A is supported in bearings 3A on a gear case 1A, a gear wheel in the form of a driven spur gear 5A is mounted on the hollow output shaft 2A and is restrained from rotation relative to the hollow output shaft 2A by a key 4A. The gear wheel is coupled to a rotary driver, in this case the driven spur gear 5A which meshes with a driving spur gear 6A.

The driving spur gear 6A is fixedly mounted on a drive shaft 6b supported in bearings 3B on the gear case 1A. The drive shaft 6B is driven for rotation by an external driving means of a mechanical apparatus, not shown, to drive the output shaft 2A for rotation. The rotation of the output shaft 2A is transmitted through a drive plate 8, a ball 15 and a driven plate 11 to a driven shaft 7.

In the first and the second embodiments, the externally threaded portion of the end portion of the driven shaft and the spring pressure adjusting nut screwed on the externally threaded portion constitute a spring pressure adjusting mechanism for adjusting the spring pressure of the coned disk spring. The means for adjusting the spring pressure of the coned disk spring is not limited to such a spring pressure adjusting mechanism and may be a spring pressure adjusting mechanism of any structure, provided that the spring pressure adjusting mechanism is capable of adjusting the axial position of the driven plate on the driven shaft relative to the seat of the spring on the hollow output shaft.

In accordance with the invention, the adjusting mechanism is external of the gear case so as to afford adjustment without disassembling the gear case 1 or 1A. For instance, a possible spring pressure adjusting mechanism may comprise a plate fixedly mounted on a portion of the driven shaft extending beyond the driven plate on the side of the extremity of the driven shaft opposite to the driven plate and provided with a plurality of threaded holes arranged on a circle concentric with the driven shaft and a plurality of adjusting bolts screwed in the threaded holes of the plate. The axial position of the driven plate can be adjusted by means of the adjusting bolts.

Figure 5:
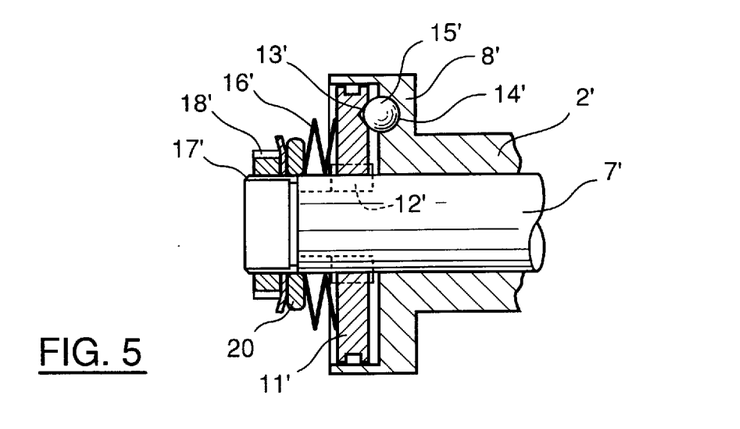
FIG. 5 is a view similar to FIG. 2 of a third embodiment according to the present invention.

FIG. 5 shows a hollow shaft reduction gear with overload protecting device in a third embodiment according to the present invention. In the third embodiment, a disk-shaped drive plate 8' is formed as a flange integral with an output shaft 2' of a hollow shaft reduction gear assembly, not shown, at one end of the output shaft 2'. A disk-shaped driven plate 11' is mounted on an end portion of a driven shaft 7' projecting from the extremity of the output shaft 2' so as to be axially movable and is restrained from rotation relative to the driven shaft 7' by a key 12'.

The drive plate 8' is provided in its one axial surface with a plurality of hemispherical holding a recesses 14' for holding a ball 15' in a circumferential arrangement, and the driven plate 11' is provided in its one axial surface with interlocking recesses 13' having the shape of a circular cone at positions in registry with the holding recesses 14', respectively.

A coned disk spring 16' for biasing the driven plate 11' toward the drive plate 8' is mounted on an end portion of the driven shaft 7' extending toward the extremity beyond the driven plate 11', a pressure ring 20 is mounted on the end portion of the driven shaft 7' on the outer side of the coned disk spring 16', and a spring pressure adjusting nut 18' is screwed on an externally threaded portion 17' formed in an end portion of the driven shaft 7' to hold the coned disk spring 16' in place on the driven shaft 7. In this embodiment, the spring 16' seats at one end against the pressure ring 20 and at the other end engages against the driven plate 11'. The externally threaded portion 17' formed in the end portion of the driven shaft 7' and the spring pressure adjusting nut 18' screwed on the externally threaded portion 17' constitute a spring pressure adjusting mechanism for adjusting the spring pressure of the coned disk spring 16' biasing the drive plate 8' axially toward the driven plate 11'.

When the output shaft 2' rotates, the rotation of the drive shaft 2' is transmitted through the drive plate 8' formed integrally with the drive shaft 2', the balls 15' and the driven plate 11' to the driven shaft 7. When an excessive load torque reacts on the driven shaft 7', the balls 15' force the driven plate 11' away from the drive plate 8' against the bias of the coned disk spring 16', and move out of the interlocking recesses 13 to permit the driven plate 11' to slip relative to the drive plate 8'. The balls 15' are held in the holding recesses 14' by the surface of the driven plate 11' facing the drive plate 8' and hence do not fall off.

The magnitude of load torque that cause the balls 15' to move out of the interlocking recesses 13' can be adjusted by adjusting the spring pressure of the coned disk spring 16' by the spring pressure adjusting nut 18'.

Although the drive plate 8' is formed integrally with the output shaft 2' in this embodiment, the drive plate 8' and the output shaft 2' may be formed separately, and the drive plate 8' may be fixed against rotation on the output shaft 2' with a key or the like.

The spring pressure adjusting mechanism may be of any structure, provided that the spring pressure adjusting mechanism is capable of adjusting the compression of the spring biasing the driven plate, without disassembling the gear case. For example, a possible spring pressure adjusting mechanism may comprise a plate fastened to the end portion of the driven shaft to prevent the spring from falling off the driven shaft, and shims interposed between the plate and the driven plate to adjust the compression of the coned disk spring mounted on the driven shaft.

The spring pressure adjusting mechanisms employed in the first, the second and the third embodiment adjust the spring pressure by turning the spring pressure adjusting nut screwed on the externally threaded portion formed in the end portion of the driven shaft and hence the magnitude of maximum limit torque can precisely be adjusted. When the drive plate and the driven plate are caused to slip relative to each other by the reaction force from an excessive load torque, the drive plate and the driven plate can easily he restored to their initial positional relation. Since the drop of the balls into the interlocking recesses can visually and auditorily, be recognized, the balls can surely be brought into engagement with the interlocking recesses.

Figure 6:
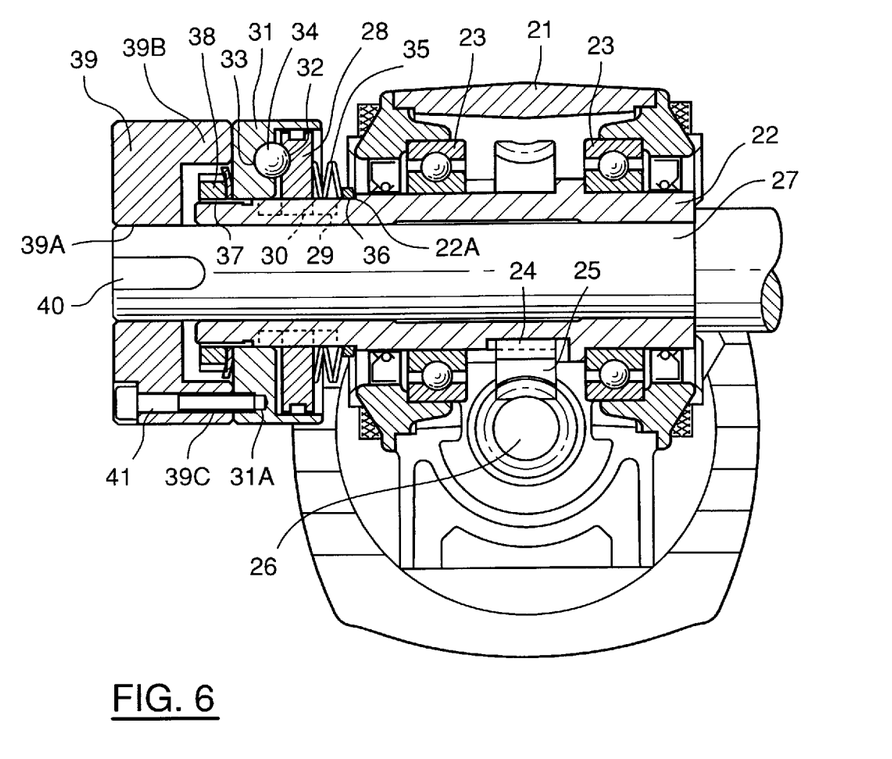
FIG. 6 is a sectional view of a fourth embodiment of a hollow shaft reduction gear assembly with overload protecting device according to the present invention.

FIG. 6 is a sectional view of a hollow shaft reduction gear with overload protecting device in a fourth embodiment according to the present invention. A hollow output shaft 22 is extended through and supported for rotation in bearings 23 on a gear case 21 having a gear wheel 25 and a rotary driver 26.

The gear wheel is a worm wheel 25 which is fastened to a middle portion of the output shaft 22 by a key 24 and meshes with the rotary driver 26 in the form of a worm which is driven for rotation by suitable mechanical apparatus having a driving means, not shown, such as a motor. A driven shaft 27 is inserted in the hollow output shaft 22 so as to be rotatable relative to the output shaft 22. A disk-shaped drive plate 28 is mounted on an end portion of the output shaft 22 external of the gear case 21.

The drive plate 28 is prevented from rotation relative to the output shaft 22 by a key 30 fitted in a keyway 29 formed in the output shaft 22 and is axially movable. A disk-shaped driven plate 31 is rotatably and axially slidably mounted on the output shaft 22 so as to confront the drive plate 28 on the end portion of the output shaft 22.

A shallow hemispherical interlocking recess 32 and a deep hemispherical holding recess 33 are formed in confronting surfaces of the drive plate 28 and the driven plate 31, respectively, and are positioned in registry with each other so that a steel ball 34 may be held between the recesses 32 and 33.

Multiple coned disk springs 35 are disposed contiguously with a surface of the drive plate 28 opposite the surface confronting the driven plate 31 to bias the drive plate 28 axially toward the driven plate 31 by the resilience of the coned disk springs 35. The end of the coned disk springs 35 opposite the end in contact with the drive plate 28 has a seat on the hollow output shaft 22. It rests on a snap ring 36 resting on a step or shoulder 22A formed on the output shaft 22.

An externally threaded portion 37 is formed in an end portion of the output shaft 22 extending beyond the driven plate 31, and a spring pressure adjusting nut 38 is screwed on the externally threaded portion 37 to prevent the axial movement of the driven plate 31 toward the extremity of the output shaft 22 and to adjust the spring pressure of the coned disk spring 35. A lock washer is positioned between the nut 38 and the plate 31 to preserve the adjustment.

One end portion of the driven shaft 27 projects from the extremity of the end portion of the output shaft 22 external to the gear case 21 and is fitted in the center bore 39A of a coupling flange 39. The coupling flange 39 is restrained from rotation relative to the driven shaft 27 by a key 40. The coupling flange 39 has an annular cylindrical side wall 39B extending toward the driven plate 31, and an axial bolt hole 39C is formed through the side wall 39B surrounding the adjusting nut 38.

A threaded hole 31A is formed in the side surface of the driven plate 31 at a position in registry with the bolt hole 39C, and a bolt 41 is inserted in the bolt hole 39C from the side of the extremity of the driven shaft 27 and screwed in the threaded hole 31A to fasten the coupling flange 39 to the driven plate 31. Thus, the driven shaft 27 is interlocked with the driven plate 31 by the coupling flange 39 for rotation together with the driven plate 31.

When the worm 26 is driven for rotation by the driving means, the rotation of the worm 26 is transmitted through the worm wheel 25 to the hollow output shaft 22 at a reduced rotating speed. The drive plate 28 rotates together with the output shaft 22.

Since the drive plate 28 is biased axially toward the confronting driven plate 31 by the coned disk springs 35, the rotation of the drive plate 28 is transmitted through the ball 34 held between the interlocking recess 32 and the holding recess 33 formed in the opposite axial surfaces of the drive plate 28 and the driven plate 31, respectively, when a load torque acting on the driven shaft 27 is not higher than a rated load torque. The rotation of the driven plate 31 is transmitted through the coupling flange 39 fastened to the driven plate 31 with the bolt 41 to the driven shaft 27.

Figure 7:
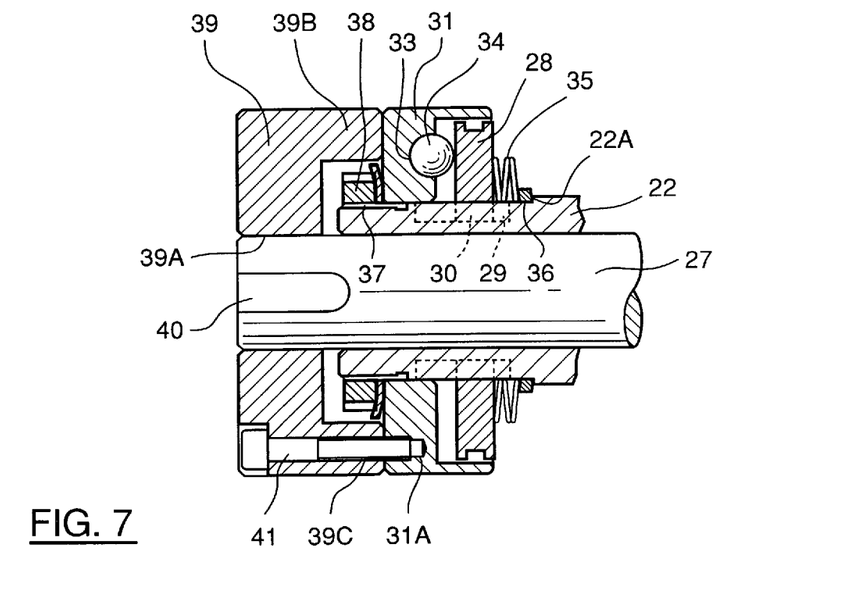
FIG. 7 is a view similar to FIG. 3 of the device of FIG. 6 in an overloaded state.

When a load torque exceeding the rated load torque acts on the driven shaft 27, the ball 34 forces the drive plate 28 away from the driven plate 31 against the biasing force of the coned disk springs 35 as shown in FIG. 7 and moves out of the interlocking recess 32 (which cannot be seen in FIG. 7) of the drive plate 28, so that the drive plate 28 and the driven plate 31 slip relative to each other.

In this embodiment, the interlocking recess 32 of the drive plate 28 has a shallow hemispherical shape, and the holding recess of the driven plate 32 has a deep hemispherical shape. Therefore, the ball 34 is able to move out of the interlocking recess 32 of the drive plate but unable to move out of the holding recess 33 of the driven plate 31 when the reaction force from an excessive load torque acts on the driven shaft 27, so that the ball 34 remains held captured in the holding recess and does not fall off.

Therefore, the ball 34 can be held again between the recesses 32 and 33 by the resilience of the coned disk spring 35 by turning the drive plate 28 relative to the driven plate 31 to an angular position where the recesses 32 and 33 register with each other.

A maximum torque that can be transmitted from the output shaft 22 to the driven shaft 27 can he adjusted by turning the spring pressure adjusting nut 38. The magnitude of maximum limit torque at which the driven plate 31 starts slipping relative to the drive plate 28 increases when the coned disk springs 35 are compressed and the spring pressure is increased by shifting the drive plate 28 and the driven plate 31 to the right, as viewed in FIG. 6, against the resilience of the coned disk springs 35, and the magnitude of maximum limit torque decreases when the drive plate 28 and the driven plate 31 are shifted to the left.

The maximum limit torque can be adjusted before connecting the driven shaft 27 to the hollow output shaft 22, for instance, before shipping the hollow shaft reduction gear from the factory, which simplifies work for installing the hollow shaft reduction gear at a place for installation. The spring pressure is adjusted to a desired value at the factory by turning the spring pressure adjusting nut 38 in a state where the coupling flange 39 is separated from the driven plate 31, the driven shaft 27 is fitted in the output shaft 22 after the hollow shaft reduction gear has been carried to a place of installation, and then the coupling flange 39 is put on the driven shaft 27, restrained from rotation relative to the driven shaft 27 with the key 40, and fastened to the driven plate 31 with the bolt 41.

Figure 8:
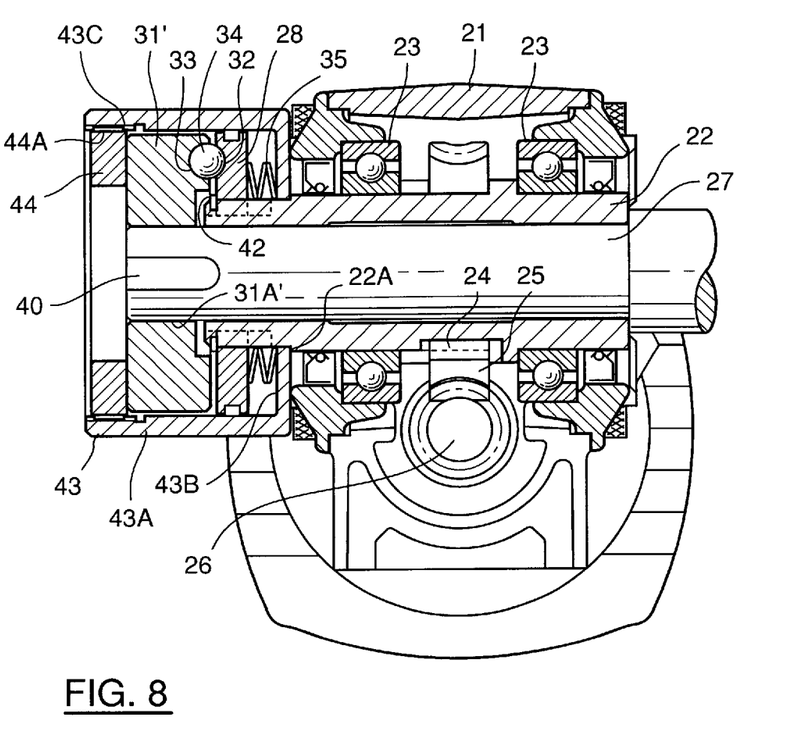
FIG. 8 is a sectional view of a fifth embodiment of a hollow shaft reduction gear assembly with overload protecting device according to the present invention.

FIG. 8 shows a hollow shaft reduction gear assembly with overload protecting device in a fifth embodiment according to the present invention. The hollow shaft reduction gear with overload protecting device in the fifth embodiment is the same in its internal structure and differs from the hollow shaft reduction gear with overload protecting device in the fourth embodiment only in the structure of its overload protecting device. In FIG. 8, parts like those shown in FIG. 6 are designated by the same reference characters, and parts which are comparable are designated with corresponding reference characters.

Referring to FIG. 8, one end portion of a driven shaft 27 projects from the extremity of one end portion of an output shaft 22 and is fitted in the center bore 31'A of a driven plate 31'. The coupling plate 31' is restrained from rotation relative to the driven shaft 27 by a key 40. A drive plate 28, similarly to the drive plate in the foregoing embodiment, is mounted axially slidably on the output shaft 22 and is restrained from rotation relative to the output shaft 22. The drive plate 28 is prevented from falling off the output shaft 22 by a snap ring 42 put on an end portion of the output shaft 22.

The driven plate 31' has an outside diameter substantially equal to that of the drive plate 28. The drive plate 28 and the driven plate 31' are surrounded by the hollow, cylindrical wall 43A of a spring pressure adjusting cover 43. Adjacent the side of a gear case 21, one end portion of the hollow, cylindrical wall is directed radially inward to form a spring support flange 43B having inner edge in sliding contact with the outer circumference of the output shaft 22. A shoulder 22A formed in the outer circumference of the output shaft 22 is in contact with the spring support flange 43B to prevent the axial movement of the spring pressure adjusting cover 43 toward the gear case 21. A coned disk spring 35 is disposed between a seat on the spring support flange 43B and the drive plate 28 to bias the drive plate 28 toward the driven plate 31'.

An internally threaded portion 43C is formed in the opposite end portion of the hollow, cylindrical wall 43A remote from the spring support flange 43B and the gear case 21. A spring pressure adjusting ring 44 provided with an external thread portion 44A in its outer circumference is screwed in the internally threaded portion 43C. The axial position of the spring pressure adjusting ring 44 on the spring pressure adjusting cover 43 is adjustable.

The spring pressure adjusting ring 44 is in contact with a surface of the driven plate 31' opposite the surface of the same confronting the drive plate 28. The spring pressure adjusting ring 44 is turned relative to the spring pressure adjusting cover 43 to change the spring pressure of the coned disk spring 35 by changing the axial position of the spring pressure adjusting cover 43 relative to the drive plate 28 and the driven plate 31'. The spring pressure adjusting ring 44 is provided with holes or grooves, not shown, with which a tool, such as a hook wrench or a spanner wrench, engages to turn the spring pressure adjusting ring 44.

When the worm 26 is driven for rotation by a driving means to rotate the output shaft 22 in a state shown in FIG. 8, the driven plate 31 rotates together with the drive plate 28, and the rotation of the driven plate 31 is transmitted through the key 40 to the driven shaft 27 when the load torque acting on the driven shaft 27 is not greater than a rated load torque.

Figure 9:
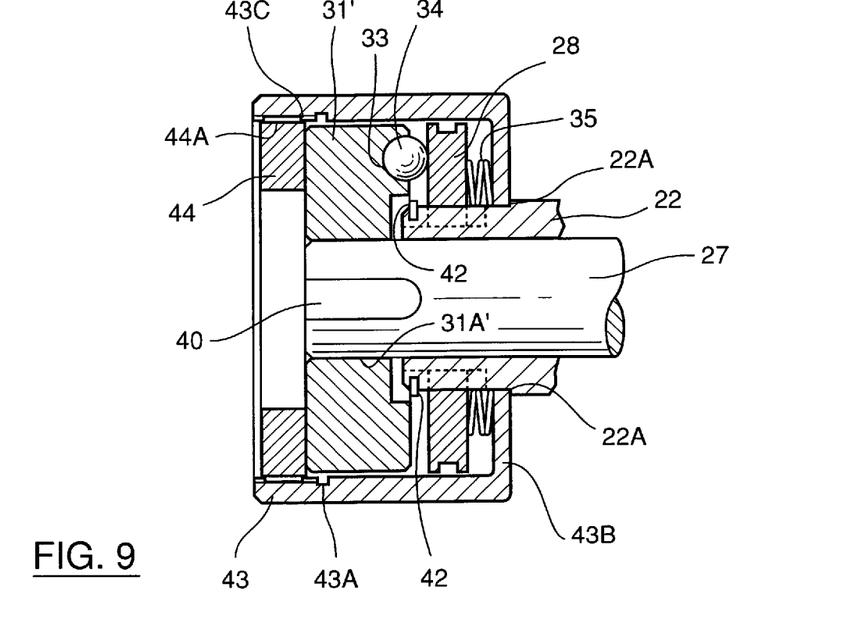
FIG. 9 is a view similar to FIG. 3 of the device of FIG. 8 in an overloaded state.

When a load torque greater than the rated load torque creates a reaction force on the driven shaft 27, the ball 34 forces the drive plate 28 to move away from the driven plate 31' against the biasing force of the coned disk spring 35 and moves out of the interlocking recess 32 of the drive plate 28. Consequently, the drive plate 28 and the driven plate 31' slip relative to each other.

Maximum limit torque that can be transmitted from the output shaft 22 to the driven shaft 27 can be adjusted, similarly to the adjustment of maximum limit torque for the fourth embodiment, before connecting the driven shaft 27 to the hollow output shaft 22. The spring pressure is adjusted to a desired value at the factory by turning the spring pressure adjusting ring 44, the driven shaft 27 is fitted in the output shaft 22 after the hollow shaft reduction gear has been carried to a place of installation, the driven plate 31' is put on the driven shaft 27, and then the key 40 is inserted between the driven shaft 27 and the center bore 31'A of the driven plate 31' to restrain the driven plate 31' from rotation relative to the driven shaft 27.

In this embodiment, the spring pressure adjusting ring 44 can be turned from outside either before or after coupling the driven shaft 27 with the output shaft 22. Therefore, any parts need not be removed for spring pressure adjustment and hence work for adjusting transmission torque is facilitated.

The maximum limit torque for the overload protecting device of each of the hollow shaft reduction gears with overload protecting device in the fourth and the fifth embodiment can be adjusted before coupling the driven shaft with the hollow output shaft. Therefore, the hollow shaft reduction gears can be delivered to users after precisely adjusting the maximum limit torque and hence, the maximum limit torque for the overload protecting device need not be adjusted at a site of installation, which simplifies work for installing the hollow shaft reduction gear.

In the first to the fifth embodiments, the interlocking recess for interlocking the driven plate with the drive plate through the ball is formed in the shape of a circular cone or a shallow hemisphere, and the holding recess for holding the ball is formed in the shape of a deep hemisphere. However, the interlocking recess may be of any shape, such as the shape of a quadrangular pyramid, provided that the ball is able to move out of the interlocking recess to force the drive plate or the driven plate to move when an excessive load torque acts on the driven shaft. The holding recess may be formed in any shape, such as a cylindrical hole that receives the ball so that the ball protrudes partly therefrom, provided that the holding recess is able to hold the ball when an excessive load torque acts on the driven shaft.

The drawings illustrate a single ball between the confronting surfaces of the drive and driven plates. There may be multiple recesses in the surfaces, thereby providing multiple positions of registry as the drive plate rotates relative to the driven plate after an excessive load torque frees the ball from the interlocking recess. In order to balance the force needed to separate the plates, the recesses may be positioned at equal angular positions around the confronting surfaces.

Although the foregoing embodiments employ the coned disk spring for holding the ball between the holding recess of the drive plate and the interlocking recess of the driven plate, the coned disk spring may be substituted by any other pressure device, such as a compression coil spring.

Furthermore, the keys for interlocking the output shaft and the drive plate, and the driven shaft and the driven plate may be substituted by other suitable means, such as splines. Although the invention has been described as applied to hollow shaft reduction gears having a worm reduction mechanism or a spur gear reduction mechanism, the present invention is applicable also to hollow shaft reduction gears having any suitable reduction mechanism, such as a helical gear reduction mechanism or a spiral bevel gear reduction mechanism.

As is apparent from the foregoing description, since the hollow shaft reduction gear with overload protecting device has the drive plate and the driven plate disposed between the end portion of the hollow output shaft projecting from the gear case and the end portion of the driven shaft projecting from the extremity of the drive shaft to transmit torque through the ball held between the drive plate and the driven plate, and the biasing force of the spring for holding the ball in the holding recess is adjusted by the spring pressure adjusting mechanism, maximum limit transmission torque can easily be adjusted.

The component parts of the overload protecting device including the drive plate, the driven plate, the ball and the spring can easily be assembled and disassembled without disassembling the gear case and hence repairing work and parts changing work are facilitated.

While particular embodiments of the invention have been herein illustrated and described, it is not intended to limit the invention to such disclosures, but changes and modifications may be made therein and thereto within the scope of the following claims.

We claim:

1. A hollow shaft reduction gear with overload protecting device, comprising:

a gear case having reduction gears therein;

a hollow output shaft, open at both ends, extended through and supported for rotation in said gear case, coupled to one of said reduction gears in said case, and having at least one end portion projecting outside from the gear case;

a driven shaft mounted against axial movement in the hollow output shaft so as to be only rotatable relative to the output shaft and having a first end portion projecting from said at least one end portion of the hollow output shaft and a second end portion projecting from said hollow shaft at the end opposite to said at least one projecting end portion of the hollow output shaft, whereby said hollow output shaft circumscribes said driven shaft between said first and second end portions; and an overload protecting device outside of said gear case coupled between the hollow output shaft and the driven shaft, said overload protecting device including a drive plate fixedly mounted on said at least one end portion of the hollow output shaft;

a driven plate mounted on said first end portion of the driven shaft so as to be axially slidable and restrained from rotation relative to the driven shaft;

said drive plate and said driven plate respectively having confronting axial surfaces, and an interlocking recess formed in one of said confronting surfaces and a holding recess formed in the other of said confronting surfaces;

a ball held between the interlocking recess and the holding recess;

a spring biasing the driven plate toward the drive plate; and a spring-pressure adjusting mechanism for adjusting the axial position of the driven plate on the driven shaft to adjust the spring pressure of the spring;

said spring seating at one end against said spring-pressure adjusting mechanism and engaging said driven plate at the other end, and the spring-pressure adjusting mechanism including an externally threaded portion in said first end portion of the driven shaft and a spring pressure adjusting nut screwed on the externally threaded portion of the driven shaft to adjust the compression of the spring, said interlocking recess and the holding recess being formed in shapes that keep the ball in the holding recess and allow the ball to move axially out of the interlocking recess when the driven shaft is overloaded, said reduction gears comprising a first gear element having a rotary axis concentric with said hollow output shaft and mounted on the exterior of said hollow output shaft, and a second gear element having a rotary axis perpendicular to the axis of said hollow output shaft, whereby rotating said second gear element at a high speed drives said first gear and the second end portion of said driven shaft at a reduced speed with overload protection provided by said overload protecting device.

2. A hollow shaft reduction gear assembly with overload protection for driving a machine having a load torque at a reduced speed from a rotary driver of a mechanical apparatus, comprising:

a driven shaft for driving said machine, a hollow output shaft coaxial with and surrounding said driven shaft, a gear wheel on said hollow shaft adapted to be coupled to said rotary driver, and a gear case housing said gear wheel;

said hollow output shaft, open at both ends, extended through and supported for rotation on said gear case and having at least one end portion projecting externally of the gear case;

said driven shaft being mounted in said hollow output shaft against axial movement and rotatable relative to the hollow output shaft and having an overload-protecting end portion projecting from said at least one end portion of the hollow output shaft and a second end portion projecting from said hollow output shaft at the end opposite to said at least one end portion of the hollow output shaft, whereby said hollow output shaft circumscribes said driven shaft between said overload-protecting end portion and said drive portion;

a first plate external of said gear case mounted on a first of said end portions so as to be axially slidable and restrained from rotation relative to said first end portion;

a second plate external of said gear case mounted on a second of said end portions so as to be axially slidable and restrained from rotation relative to said second end portion;

said first and second plates respectively having confronting axial surfaces, and an interlocking recess formed in one of said confronting surfaces and a holding recess formed in the other of said confronting surfaces;

a ball held between the interlocking recess and the holding recess; and a pressure device external of said gear case biasing the first and second plates axially toward each other with a set force, including pressure-adjusting mechanism external of said gear case for adjusting the set force;

said interlocking recess and the holding recess being formed in shapes that keep the ball in the holding recess and allow the ball to move out of the interlocking recess when the driven shaft is overloaded by the load torque which transmits a reaction force above said set force, said gear case mounting said gear wheel with a rotary axis concentric with said hollow output shaft and mounting a second gear element having a rotary axis perpendicular to the axis of said hollow output shaft for connection to the rotary driver of the mechanical apparatus, whereby rotating said second gear element at a high speed drives said first gear and the second end portion of said driven shaft at a reduced speed with overload protection provided by said overload protecting device.

3. A hollow shaft reduction gear assembly with overload protection according to claim 2, wherein at least one of the confronting surfaces has a plurality of recesses at angularly spaced positions to register with said recess in the other of said confronting surfaces when said first and second plates are relatively angularly displaced.

4. A hollow shaft reduction gear assembly with overload protection according to claim 2, wherein each of said confronting surfaces has a plurality of recesses at angularly spaced positions, said recesses being in registry at corresponding angular positions.

5. A hollow shaft reduction gear assembly with overload protection according to claim 4, wherein said registering recesses each have a ball transmitting driving force from the first plate to the second plate when the load torque provides a reaction force below said set force.

6. A hollow shaft reduction gear assembly with overload protection according to claim 4, wherein said recesses are spaced at equal angular intervals circumferentially in each confronting surface.

7. An assembly according to claim 2 wherein said pressure-adjusting mechanism includes an annular spring having a seat at one axial end and engaging one of said plates at the other end, and means secured to said driven shaft to adjust the relative axial spacing of said seat and said one plate.

\* \* \* \* \*